(12) United States Patent
Pfadenhauer

(10) Patent No.: US 7,721,593 B2
(45) Date of Patent: May 25, 2010

(54) SYSTEM FOR SETTING A SPATIAL POSITION FOR A MOTOR VEHICLE

(75) Inventor: Michael Pfadenhauer, Muehlgasse (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 180 days.

(21) Appl. No.: 12/037,690

(22) Filed: Feb. 26, 2008

(65) Prior Publication Data
US 2008/0257029 A1 Oct. 23, 2008

(30) Foreign Application Priority Data
Apr. 18, 2007 (DE) .................. 10 2007 018 166

(51) Int. Cl.
*G01M 17/007* (2006.01)
(52) U.S. Cl. .................. 73/147; 73/117.03; 73/118.01
(58) Field of Classification Search ............. 73/116.01, 73/117.01, 117.03, 118.01, 147
See application file for complete search history.

(56) References Cited

U.S. PATENT DOCUMENTS

| 4,625,993 | A | * | 12/1986 | Williams et al. | 280/5.507 |
| 4,768,374 | A | * | 9/1988 | Fouchey | 73/115.07 |
| 5,004,257 | A | * | 4/1991 | MacIsaac | 280/5.507 |
| 5,310,200 | A | * | 5/1994 | MacIsaac | 280/5.506 |
| 5,788,016 | A | * | 8/1998 | Soulas et al. | 187/238 |
| 6,036,201 | A | * | 3/2000 | Pond et al. | 280/5.514 |
| 6,564,621 | B1 | * | 5/2003 | Keaton | 73/117.02 |
| 6,612,152 | B2 | * | 9/2003 | Keaton et al. | 73/11.04 |

FOREIGN PATENT DOCUMENTS

| DE | 42 38 691 A1 | 5/1994 |
| DE | 42 38 691 C2 | 5/1994 |
| DE | 298 05 174 U1 | 7/1998 |
| DE | 198 15 312 C1 | 11/1999 |
| DE | 101 44 111 A1 | 3/2003 |
| DE | 103 52 212 A1 | 2/2005 |
| DE | 10 2004 032 081 A1 | 3/2005 |
| DE | 10 2006 006 871 A1 | 8/2007 |

* cited by examiner

*Primary Examiner*—Eric S McCall
(74) *Attorney, Agent, or Firm*—Gerald E. Hespos; Michael J. Porco

(57) ABSTRACT

A system for setting a spatial position of a vehicle relative to a foundation, on which the vehicle is standing with its wheels, in particular in a wind tunnel, is provided. The adjusting system includes a plurality of linear actuating devices, which are assigned to each one of the wheels and which are mounted on the vehicle in the area of the respective wheel and with which in the area of the respective wheel a distance between the foundation and a vehicle chassis can be set. The adjusting system includes a plurality of measuring devices, which are assigned to each one of the actuating devices, for determining the distance between the foundation and the vehicle chassis in the area of the respective wheel.

16 Claims, 2 Drawing Sheets

SYSTEM FOR SETTING A SPATIAL POSITION FOR A MOTOR VEHICLE

CROSS REFERENCE TO RELATED APPLICATIONS

This application claims the priority of German Application No. 10 2007 018 166.5, filed Apr. 18, 2007, the disclosure of which is expressly incorporated by reference herein.

BACKGROUND AND SUMMARY OF THE INVENTION

The present invention relates to a system for setting a spatial position of a vehicle relative to a foundation on which the vehicle is standing with its wheels, in particular in a wind tunnel.

German patent document DE 198 15 312 C1 discloses a device, by which a vehicle can be placed into a test section of a wind tunnel. During the measurement process, this system is deactivated by transferring it into a stand-by position, which does not influence and/or disturb the measuring process.

It is known from German patent document DE 42 38 691 C2 to place the wheels of a vehicle in such a position in wind tunnel models that they are self-stabilizing in order to automatically compensate for any disturbances that may develop.

In wind tunnel testing of motor vehicles, in particular sports vehicles or racing vehicles, it may be necessary to change the position and orientation of the vehicle relative to the foundation on which the vehicle is standing with its wheels. This may be done in order, for example, to simulate the effects caused by changes in the vehicle's position and orientation based on the dynamic processes while operating the vehicle, such as the processes of steering, braking and accelerating. It may also be done in order to test the aerodynamic parameters of the vehicle. In particular, in racing vehicles, where the distance between the vehicle and the ground is negligible, one would expect dramatic aerodynamic changes with a change in position in the millimeter range.

The present invention focuses on the problem of providing a possibility—for setting a position and orientation of a vehicle relative to a foundation, on which the vehicle is standing with its wheels—that is especially appropriate for wind tunnel measurements.

This problem is solved by providing a system for setting a spatial position of a vehicle relative to a foundation on which the vehicle is standing with its wheels, in particular in a wind tunnel. A plurality of linear actuating devices are respectively assigned to each one of the wheels and are mounted on the vehicle in the area of the respective wheel. In the area of the respective wheel, a distance between the foundation and a vehicle chassis can be set with the linear actuating devices. A plurality of measuring devices are respectively assigned to each one of the actuating devices for determining the distance between the foundation and the vehicle chassis in the area of the respective wheel. A control unit is coupled to the measuring devices for actuating the actuating devices. Advantageous embodiments are further described herein.

The invention is based on the general idea of assigning a linear actuating device to a plurality of wheels (or to all of the wheels) of a vehicle. By using the linear actuating device, a distance between the foundation and a vehicle chassis can be set in the area of the respective wheel. Furthermore, the actuating devices may be assigned measuring devices, with which the distance between the foundation and the vehicle chassis can be determined in the area of the respective wheel. In addition, there is a control unit, which is coupled to the measuring devices, for actuating the actuating devices. The inventive adjusting device makes it possible to set the distance between the foundation and the vehicle chassis at each wheel that is equipped with such an actuating device. Therefore, the individual actuating devices can be actuated independently of each other, so that by using the control unit it is possible to set different position and orientation parameters of the vehicle, such as a vehicle to ground distance, thus, in particular, the distance between the foundation and a specific reference point (preferably arranged on the vehicle floor) on the vehicle chassis; a vehicle rolling angle, thus the tilt of the vehicle in relation to the foundation about a vehicle longitudinal axis; as well as a vehicle pitch angle, thus the tilt of the vehicle in relation to the foundation about a vehicle transverse axis.

Therefore, an embodiment in which the control unit is disposed externally with respect to the vehicle is especially advantageous. In particular, the control unit may be disposed in a control center of the wind tunnel. In this way it is possible, in particular, to change the position and orientation of the vehicle in relation to the foundation without having to interrupt the measuring process. In this way, the test bed periods and, thus, the test bed costs, may be significantly reduced. To this end, actuating devices that form with the respective measuring device one unit, which can be, in particular, pre-mounted in its entirety and can be attached as one unit to the vehicle, are especially advantageous. For example, the respective measuring device may be attached to the respective actuating device or installed or integrated therein.

Other important features and advantages of the invention follow from the dependent claims, the drawings and the respective description of the figures with reference to the drawings. It is clear that the aforementioned features and those features to be explained below can be used not only in the respective cited combination, but also in other combinations or alone without departing from the scope of the present invention.

Preferred embodiments of the invention are depicted in the drawings and are explained in detail in the following description. In this case identical reference numerals refer to the same or similar or functionally identical components.

DETAILED DESCRIPTION OF THE DRAWINGS

Figure 1:
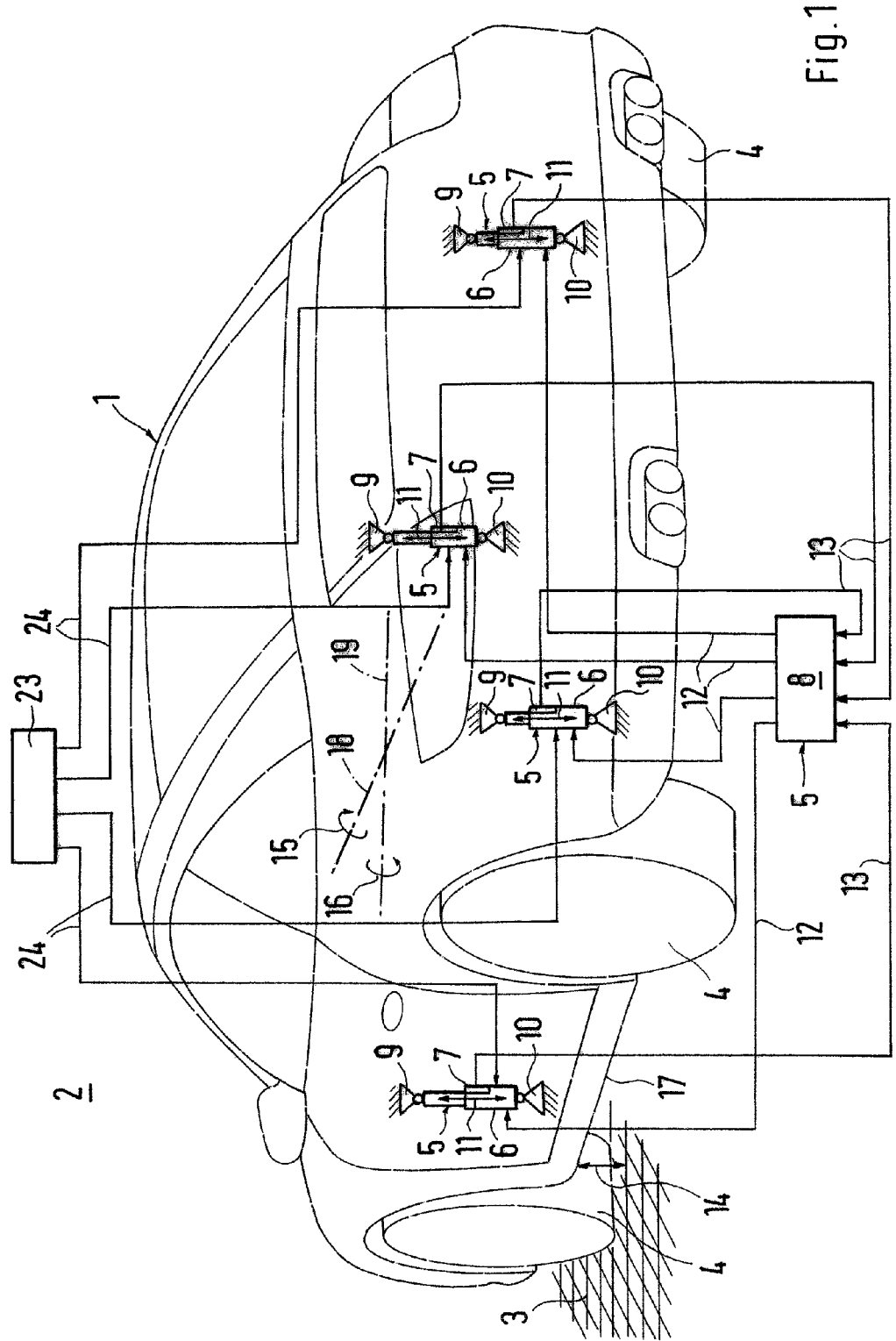
FIG. 1 is a perspective view of a vehicle, which is coupled to an adjusting device.

FIG. 1 depicts a vehicle 1, which is preferably a sports vehicle, and in particular a racing vehicle. The vehicle 1 is placed in a test bed 2, which is preferably a wind tunnel. The test bed 2 has a floor 3, which forms a foundation for the vehicle 1. This foundation is also marked below with the reference numeral 3. The vehicle 1 is standing with its wheels 4 on this foundation 3.

In order to be able to set or define the position and orientation of the vehicle 1 relative to the foundation 3, there is an adjusting system 5. This adjusting system 5 includes a plurality of linear actuating systems 6, a plurality of measuring devices 7 and a control unit 8. In this case, the actuating devices 6 are assigned to each one of the wheels 4. In the illustrated example, each wheel 4 is assigned such an actuating device 6. In principle, however, a number of actuating devices 6 that is not equal to the number of wheels 4 may also be used, in particular, in the case of twin wheels. Each linear actuating device 6 is supported, on the one hand, on a vehicle chassis 9 and, on the other hand, indirectly, for example, by way of a transverse link 10, on the respective wheel 4. The respective actuating device 6 may change the distance between its support points, thus performing a bi-directional lift state that is indicated by the double arrows 11 in FIG. 1. The actuating devices 6 are installed, if desired, so that their lift direction 11 is oriented in essence orthogonally to the foundation 3. By using the respective actuating device 6 a distance between the foundation 3 and the vehicle chassis 9 can be changed and/or selectively adjusted in the area of the respective wheel 4.

The measuring devices 7 are assigned to each one of the actuating devices 6. Preferably, each actuating device 6 has such a measuring device 7. The measuring devices 7 serve to determine the distance between the foundation 3 and the vehicle chassis 9 in the area of the respective wheel 4. To this end, the respective measuring device 7 detects a quantity that correlates to the distance. In particular, the measuring device 7 can determine the lift 11 of the respective actuating device 6. Similarly, it is possible, in principle, to configure the measuring devices 7 in such a manner that they measure directly the respective distance, for example, by using ultrasound or by way of a probe, which makes contact with the foundation 3.

The control unit 8 is connected, on the one hand, by way of the control lines 12 to the actuating devices 6 and, on the other hand, by way of signal lines 13 to the measuring devices 7. The control unit 8 is configured for actuating the actuating devices 6. In particular, they can actuate the individual actuating devices 6 one by one and independently of each other. Owing to the measuring devices 7, the control unit 8 knows the momentary position and orientation of the vehicle 1 relative to the foundation 3. By using the actuating devices 6, the control unit 8 can set a desired position and orientation for the vehicle 1 relative to the foundation 3.

Basically, the control unit 8 could be disposed internally, thus in the interior of the vehicle 1. However, the embodiment that is illustrated here is preferred. In this case, the control unit 8 is arranged externally with respect to the vehicle 1. In particular, the control unit 8 can be arranged, for example, in a control center (which is not shown here) of the wind tunnel 2. Hence, it is possible to actuate the actuating devices 5 by way of the control unit 8 and to change the position and orientation of the vehicle 1, while the wind tunnel 2 is in operation.

By using the adjusting system 5, a plurality of parameters, defining the position and orientation of the vehicle 1 relative to the foundation 3, can be set and/or changed. Such position and orientation parameters are, for example, a vehicle to ground distance 14, a vehicle rolling angle 15, as well as a vehicle pitch angle 16. In this case the vehicle to ground distance 14 is measured, in particular, between the foundation 3 and a specific reference point of a vehicle floor 17. In this case, it concerns, in particular, a distance 14, averaged over the entire vehicle floor 17. The vehicle rolling angle 15 corresponds to the tilt of the vehicle 1 about a vehicle longitudinal axis 18 relative to the foundation 3. Such rolling motions may occur when the vehicle is in motion, for example, when driving through curves. The vehicle pitch angle 16 corresponds to the tilt of the vehicle 1 about a vehicle transverse axis 19 relative to the foundation 3. Such pitch motions may occur when accelerating or braking a vehicle 1.

In an especially advantageous embodiment, the control unit 8 may be configured in such a manner that it automatically actuates the individual actuating drives 6 as a function of the position and orientation parameters, which can be input or predefined—such as the vehicle to ground distance 14, and/or the vehicle rolling angle 15 and/or the vehicle pitch angle 16—in order to adjust the desired position and orientation parameters, and ultimately in the end to adjust the desired position and orientation of the vehicle 1 relative to the foundation 3. Therefore, the control unit 8 automatically converts the desired position and orientation into corresponding control commands of the respective actuating device(s) 6.

Figure 2:
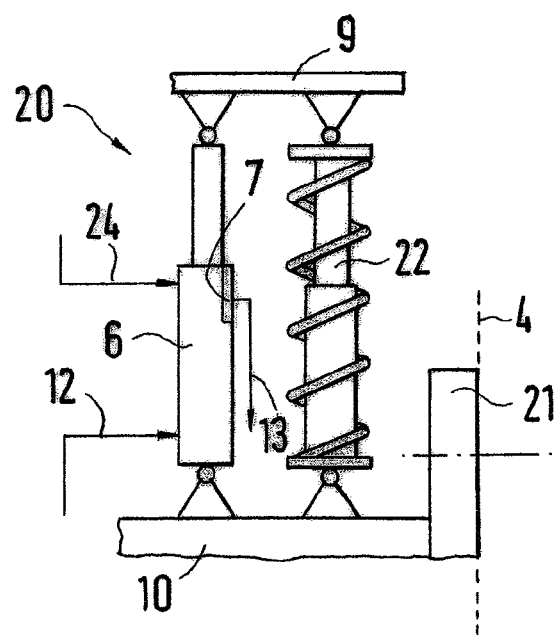
FIG. 2 is an extremely simplified view in the area of the wheel suspension of the vehicle.

According to FIG. 2, the actuating devices 6 are mounted on the respective wheel 4 in the area of a wheel suspension 20 of the respective wheel 4. FIG. 2 shows a transverse link 10, on which a wheel carrier or wheel bearing 21 is supported and which is supported on the vehicle chassis 9—for example, in the area of a suspension strut crown (not shown here in detail)—in the conventional manner by way of a suspension strut and/or shock absorber strut 22. In the embodiment shown in FIG. 2, the respective actuating device 6 is arranged in the area of the respective wheel 4, acting in parallel to the suspension strut and/or shock absorber strut 22, assigned to this wheel 4. Similarly it is also possible, in principle, to assign the respective actuating device 6 in the area of the wheel 4, instead of the respective suspension strut and/or shock absorber strut 22.

The actuating devices 6 may be configured as electric, pneumatic, or as hydraulic actuating devices 6 and may be driven, accordingly, with electric, pneumatic, or hydraulic energy. In order to supply the actuating devices 6 with drive energy, there may be an energy supply 23, which is coupled in a suitable manner to the individual actuating devices 6 via corresponding supply lines 24. In principle, such an energy supply 23 may be arranged internally in the vehicle 1 or may be formed at least partially by way of the vehicle's own systems. Similarly, the energy supply 23 may also be arranged externally with respect to the vehicle 1. In this case, it is possible to use, in particular, the energy supply which exists in any event in the respective test bed (or rather wind tunnel 2) as the energy supply 23, in that only the supply lines 24 are connected to the existing energy supply 23. The external energy supply 23 is independent of the vehicle 1, so that the adjusting system 5 is, therefore, self sufficient.

In the embodiments that are illustrated here, the respective measuring device 7 is attached to the respective actuating device 6 or integrated therein. In particular, FIG. 3 shows an integral construction, in which the measuring device together with the actuating device 6 forms a structural unit.

Figure 3:
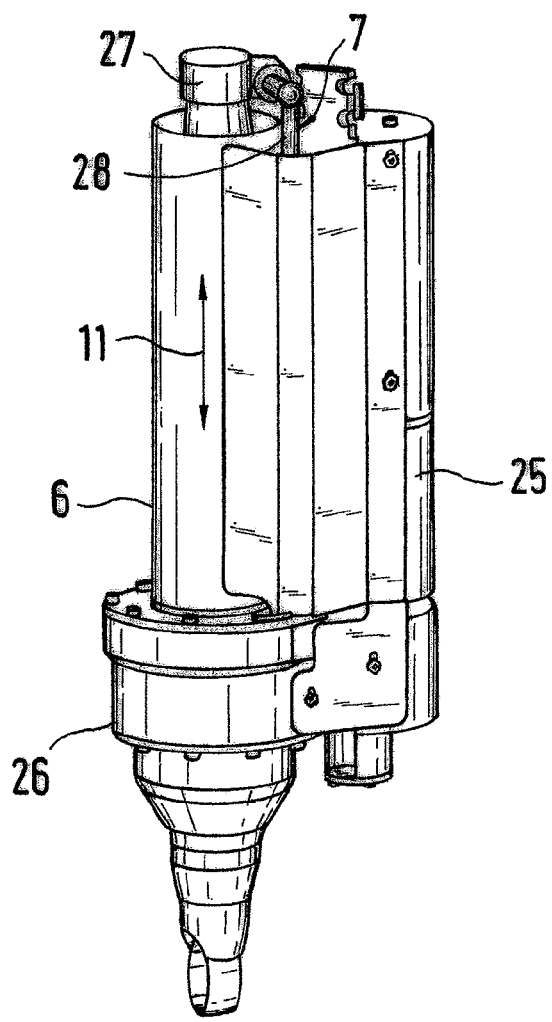
FIG. 3 is a perspective view of an adjusting device.

In the embodiment shown in FIG. 3, the illustrated actuating device 6 is configured as an electromotive actuating device 6. The actuating device 6 includes, in particular, an electric motor 25, which drives, for example, a spindle drive 26, in order to extend or retract a lift rod 27 according to the respective desired lift 11. In this case, the measuring device 7 includes a linear position sensor 28, which is coupled to the lift rod 27, so that it follows the lift motion of the lift rod 27. A corresponding sensor system measures the relative displacement of the position sensor 28 with respect to a stationary component of the measuring device 7.

The actuating devices 6 may be configured, according to an especially advantageous embodiment, such that in the installed state they make it possible to drive the vehicle 1 relative to the foundation 3. Thus, the actuating devices 6 may be installed, for example, in a suitable workshop. The vehicle 1, which is equipped with the actuating devices 6, may be driven by pushing or by means of its own drive into the test bed or wind tunnel 2, which is at a distance from the workshop. For example, the respective actuating device 6 may be enabled in the passive state that allows the actuating device to follow more or less the lift movements of the respective suspension strut and/or shock absorbing strut 22.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for setting a spatial position of a vehicle relative to a foundation on which the vehicle stands with its wheels in a wind tunnel, the system comprising:
    a plurality of linear actuating devices assigned respectively to each one of the wheels and being mounted on the vehicle in an area of a respective wheel, wherein a distance between the foundation of the wind tunnel and a chassis of the vehicle is settable in the area of the respective wheels via the plurality of linear actuating devices;
    a plurality of measuring devices assigned respectively to each one of the actuating devices for determining the distance between the foundation and the vehicle chassis in the area of the respective wheels; and
    a control unit disposed externally of and spaced from the vehicle and being operatively coupled to the plurality of measuring devices, the control unit controlling actuation of the linear actuating devices.

2. The system according to claim 1 wherein the control unit is disposed in a control center of the wind tunnel.

3. The system according to claim 1, wherein a each of the respective measuring devices is mounted to a respective one of the actuating devices to form a constructional structural unit that can be mounted to the vehicle.

4. The system according to claim 1, wherein the plurality of linear actuating devices are operatively installed in the vehicle such that the vehicle is drivable relative to the foundation.

5. The system according to claim 1, wherein at least one of the linear actuating devices is an electromotor actuating device having a spindle drive.

6. The system according to claim 1, wherein a respective actuating device is arranged on the vehicle in the area of the respective wheel instead of or in parallel to at least one of a suspension strut and shock absorber strut assigned to the respective wheel.

7. The system according to claim 1, wherein each of the plurality of measuring devices measure the distance between the vehicle chassis and the foundation using ultrasound.

8. The system according to claim 1, wherein each of the plurality of measuring devices has probe to measure the distance between the vehicle chassis and the foundation using a probe.

9. The system according to claim 1, wherein the control unit is operatively configured to automatically actuate the linear actuating devices as a function of position and orientation parameters in order to adjust the position and orientation parameters.

10. The system according to claim 9, wherein the position and orientation parameters are input or predefined and comprise at least one of a vehicle to ground distance, a vehicle rolling angle, and a vehicle pitch angle.

11. The system according to claim 1, wherein the plurality of linear actuating devices are driven via one of electric, pneumatic, and hydraulic energy.

12. The system according to claim 11, further comprising an energy supply disposed externally with respect to the vehicle and being coupled via supply lines to the plurality of linear actuating devices.

13. The system according to claim 11, wherein, each of the actuating devices has an electric motor driving a spindle drive, the spindle drive extending or retracting a lift rod in a lift direction for manipulating the distance between the foundation and the vehicle chassis.

14. The system according to claim 13, wherein each of the actuating devices is oriented so that the lift direction is substantially orthogonal to the foundation.

15. A component of an adjusting system for setting a spatial position of a vehicle relative to a foundation of a wind tunnel on which the vehicle stands with its wheels, comprising:
    a linear actuating device for the adjusting system, the linear actuating device being operatively configured for attachment to the vehicle in an area of a wheel in place of at least one of a suspension strut and shock absorber assigned to the respective; and
    a control unit disposed externally of and spaced from the vehicle, the control unit being operatively connected to the linear actuating device for selectively setting the spatial position of the vehicle relative to the foundation of the wind tunnel.

16. A component of an adjusting system for setting a spatial position of a vehicle relative to a foundation of a wind tunnel on which the vehicle stands with its wheels, comprising:
    a linear actuating device for the adjusting system, the linear actuating device being operatively configured for attachment to the vehicle in an area of a wheel in order to act in parallel to at least one of a suspension strut and shock absorber strut assigned to the respective wheel; and
    a control unit disposed externally of and spaced from the vehicle, the control unit being operatively connected to the linear actuating device for selectively setting the spatial position of the vehicle relative to the foundation of the wind tunnel.

* * * * *